US006181093B1

(12) United States Patent
Park et al.

(10) Patent No.: US 6,181,093 B1
(45) Date of Patent: Jan. 30, 2001

(54) COMMUTATION CIRCUIT FOR A SENSORLESS THREE-PHASE BRUSHLESS DIRECT CURENT MOTOR

(75) Inventors: Shi-Hong Park; Yun-Kee Lee, both of Seoul (KR)

(73) Assignee: Fairchail Korea Semiconductor Ltd., Kyungki-do (KR)

(*) Notice: Under 35 U.S.C. 154(b), the term of this patent shall be extended for 0 days.

(21) Appl. No.: 09/376,034

(22) Filed: Aug. 17, 1999

(30) Foreign Application Priority Data

Aug. 21, 1998 (KR) .................................................. 98-33988

(51) Int. Cl.[7] ......................................................... H02P 1/18
(52) U.S. Cl. .......................... 318/254; 318/138; 318/439; 318/723; 318/430
(58) Field of Search ..................................... 318/138, 254, 318/439, 720, 721, 722, 723, 724, 430, 431

(56) References Cited

U.S. PATENT DOCUMENTS

| 4,574,225 | * | 3/1986 | Pershall et al. | 318/254 |
|---|---|---|---|---|
| 5,159,246 | * | 10/1992 | Ueki | 318/254 |
| 5,294,877 | * | 3/1994 | Cameron | 318/809 |
| 5,317,243 | * | 5/1994 | Cameron | 318/254 |
| 5,491,393 | * | 2/1996 | Uesugi | 318/439 |
| 5,493,195 | * | 2/1996 | Hehlund et al. | 318/701 |
| 5,606,232 | * | 2/1997 | Harlan et al. | 318/138 |
| 5,744,921 | * | 4/1998 | Makaran | 318/254 |
| 5,751,128 | * | 5/1998 | Chalupa et al. | 318/439 |
| 5,767,639 | * | 6/1998 | Sakaguchi et al. | 318/254 |
| 5,793,180 | * | 8/1998 | Maiocchi et al. | 318/778 |

* cited by examiner

Primary Examiner—David Martin
Assistant Examiner—Rita Leykin
(74) Attorney, Agent, or Firm—Marshall, O'Toole, Gerstein, Murray & Borun (57) ABSTRACT

A commutation circuit for a sensorless three-phase BLDC motor enables soft switching in the commutation process without the need for a complex delay circuit and generates signals separate from the back EMF signals of the stator to start the rotation of the motor rotor. The commutation circuit includes a starting circuit adapted to generate a starting clock signal to forcibly start the motor without information associated with the position of the motor rotor and generates first, second and third reference clock signals that are used to drive the motor in constant velocity operation. The commutation circuit also includes a constant velocity controlling circuit that compares the voltages from each of the phases to the neutral voltage of the stator and a stair/common voltage generating circuit that provides a first group of stair voltages and a common voltage to forcibly start rotation of the rotor or, alternatively, a second group of stair voltages with a second common voltage to optimally commutate the phases when the rotor is accelerating is turning at a constant operational speed.

19 Claims, 9 Drawing Sheets

FIG.6A (where, R1=R2=R3=R4)

FIG.6B

| Vout | S1 | S2 |
|---|---|---|
| more than reference voltage(①) | ON | OFF |
| equal to reference voltage(②) | OFF ON | OFF ON |
| less than reference voltage(③) | OFF | ON |

① $Vout = \dfrac{R4}{\left(\dfrac{1}{\dfrac{1}{R1}+\dfrac{1}{R2}}\right)+R4} Vcc$ ② $Vout = \dfrac{Vcc}{2}$ ③ $Vout = \dfrac{\dfrac{1}{\dfrac{1}{R3}+\dfrac{1}{R4}}}{\left(\dfrac{1}{\dfrac{1}{R3}+\dfrac{1}{R4}}\right)+R2} Vcc$

COMMUTATION CIRCUIT FOR A SENSORLESS THREE-PHASE BRUSHLESS DIRECT CURENT MOTOR

BACKGROUND OF THE INVENTION

1. Field of the Invention

The invention relates to a three-phase brushless direct current motor. More particularly, the invention relates to a commutation circuit for a sensorless three-phase brushless direct current motor.

2. Description of Related Technology

In controlling currents through the windings of a three-phase brushless direct current (BLDC) motor, commutation is conventionally accomplished using Hall-effect sensors. The Hall-effect sensors are used to detect the position of the permanent magnets in the motor rotor to provide signals associated with the absolute position of the rotor to the commutation circuitry. Conventional commutation circuits use the phase and amplitude of the Hall-effect sensor signals to soft-switch the current in the motor windings during constant velocity operation of the motor. Additionally, the Hall-effect sensor signals may be used to provide the desired commutation during initial starting of the motor.

Figure 1:
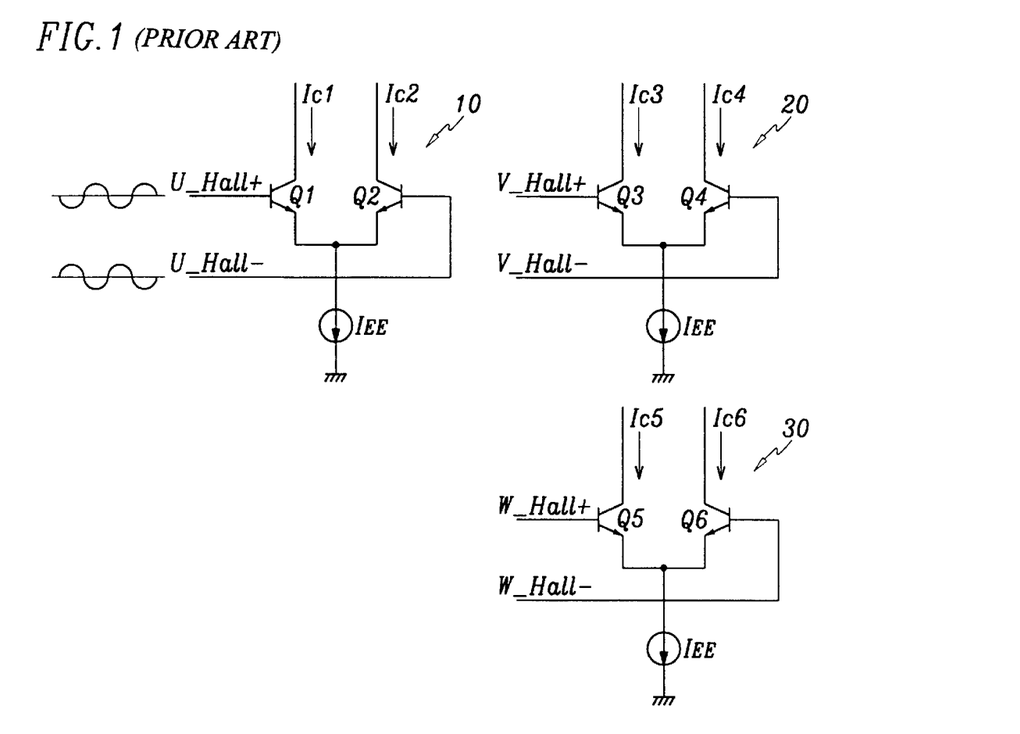
FIG. 1 illustrates a typical input stage of an output driving circuit in a conventional three-phase BLDC motor commutation circuit.

FIG. 1 illustrates a typical input stage of an output driving circuit in a conventional three-phase BLDC motor commutation circuit. The input stage includes three differential amplifiers 10, 20, 30 that receive signal pairs U_Hall+/U_Hall−, V_Hall+/V_Hall−, W_Hall+/W_Hall− from three respective Hall-effect sensors (not shown). The phase difference between the signals of each signal pair is 180°.

Where the difference between the individual signals of the signal pairs is less than 100 mV (i.e., approximately four times the thermal voltage $V_T$), the output currents $I_c1$–$I_c6$ of the differential amplifiers 10, 20, 30 are linearly increased or decreased. Where the difference between the individual signals of the signal pairs is greater than 100 mV, the output currents Ic1–Ic6 of the differential amplifiers 10, 20, 30 are limited by the current source $I_{EE}$. Because the output currents $I_c1$–$I_c6$ of the differential amplifiers 10, 20, 30 are linearly increased or decreased for signal pair differences in an interval surrounding zero volts, the output stage of the output driving circuit can be soft switched in the interval surrounding zero volts. Soft switching prevents the excitation current of the stator coil of the motor from changing rapidly, thereby allowing the motor to rotate freely without sparks.

In contrast to the above-described conventional commutation circuit, which uses Hall-effect sensors, a sensorless three-phase BLDC motor commutation circuit uses back electromotive force EMF, which is generated in the unexcited phase of a stator coil, instead of Hall-effect signals. In particular, a zero crossing point at which the back EMF and neutral point voltage intersect is detected, and commutation is accomplished by using the zero crossing point to determine the absolute position of the motor rotor.

Figure 2:
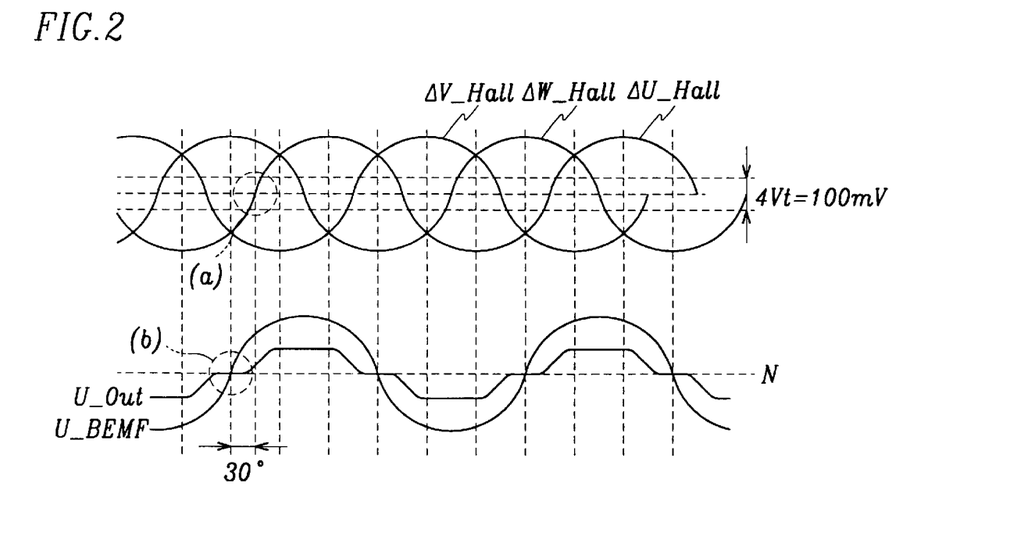
FIG. 2 illustrates a timing diagram showing the time domain relationship between the conventional commutation signals of a three-phase BLDC motor using three Hall-effect sensors and the zero crossing point of a sensorless three-phase BLDC motor.

FIG. 2 illustrates a timing diagram that shows the time domain relationship between the conventional commutation signals of a three-phase BLDC motor having three Hall-effect sensors and the zero crossing point of a sensorless three-phase BLDC motor. Detail (a) in FIG. 2 highlights a region in which the voltage difference between the signals of the U_Hall signal pair is less than 100 mV, thereby allowing conventional commutation to accomplish soft switching within the highlighted region. Detail (b) highlights a region surrounding the point at which the back EMF U_BEMF and the neutral point N intersect for a sensorless three-phase BLDC motor. As shown by detail (b) of FIG. 2, when the motor is driving with a constant velocity, the zero crossing point electrically leads the conventional commutation soft switching point by 30°. Thus, to optimize commutation in a sensorless three-phase BLDC motor using the back EMF signal, the phase of the back EMF signal must be electrically delayed by 30° before it is used in conjunction with the zero crossing point to perform commutation.

Generally, a complex delay circuit having a plurality of delay elements is needed to delay the back EMF signal. Furthermore, the combination of the current flowing through the motor windings and the resistance of the windings introduces substantial non-ideal voltages that make detection of the back EMF signal difficult and prone to error. Still further, a commutation mode using back EMF signals is typically a hard switching mode, which may produce undesirable sparks together with electromagnetic interference (EMI) in the switching process. While a snubber circuit may used to suppress the sparking and the EMI, this further increases the complexity of the delay circuit.

Additional complications arise in starting a stopped sensorless three-phase BLDC motor because the back EMF signal exhibits a poor signal-to-noise ratio and is an unreliable indicator of the rotor position until the motor has a reached a sufficient rotor speed. As a result, if commutation is started by using information from the back EMF signal that is detected during the forcible start of the motor an unstable commutation could result, which could stop rotation of the motor or rotate the rotor in an undesirable direction.

SUMMARY OF THE INVENTION

Generally, the invention provides a commutation circuit for a sensorless three-phase BLDC motor that enables soft switching in the commutation process without the need for a complex delay circuit and which provides signals separate from the back EMF signals to start the rotation of the motor rotor.

The commutation circuit includes a starting circuit adapted to generate a selection signal that indicates whether a motor is in a starting mode or a constant velocity mode by detecting the size of each phase voltage of the motor stator coil. The starting circuit also generates a starting clock signal to forcibly start the motor without information associated with the position of the motor rotor and generates first, second and third reference clock signals having respective phase differences of 120° and that are synchronized with the starting clock signal.

The commutation circuit further includes a constant velocity controlling circuit that is adapted to compare each phase voltage and a neutral point voltage of the stator to generate first, second and third comparison signals and a constant velocity clock signal having a frequency three times the frequency of the comparison signals.

The commutation circuit still further includes a stair/common voltage generating circuit, that is responsive to the selection signal generated by the starting circuit in the starting mode such that the reference clock signals simultaneously generate a first group of three stair voltages having respective phase difference of 120° when iterating three-phase with a first voltage equal to a reference voltage during a first period of the starting clock signal, iterating three-phase with a second voltage less than the reference voltage during subsequent second and third periods of the starting clock signal, iterating three-phase with the reference voltage during a subsequent fourth period of the starting clock signal, and iterating three-phase with a third voltage greater than the reference voltage during subsequent fifth and sixth periods of the starting clock signal, and, in the constant velocity mode of the motor, uses the reference clock signals to simultaneously generate a second group of three stair voltages having respective phase difference of 120°, when iterating three-phase with a fourth voltage equal to a second reference voltage during a first period of the constant velocity clock signal, iterating three-phase a fifth voltage less than the second reference voltage during subsequent second and third periods of the constant velocity clock signal, iterating three-phase with the second reference voltage during a subsequent fourth period of constant velocity clock signal, and iterating three-phase with a sixth voltage greater than the second reference voltage during subsequent fifth and sixth periods of the constant velocity clock signal.

The commutation circuit still further includes an output driving circuit, controlling the direction of the current in the respective phases of the stator coil using the voltage differences between the first group of stair voltages and a first common voltage in the starting mode of the motor and using the voltage differences between the second group of stair voltages and a second common voltage in the constant velocity mode of the motor.

The invention itself, together with further objects and attendant advantages, will best be understood by reference to the following detailed description, taken in conjunction with the accompanying drawings.

DETAILED DESCRIPTION OF THE PREFERRED EMBODIMENTS

Figure 3:
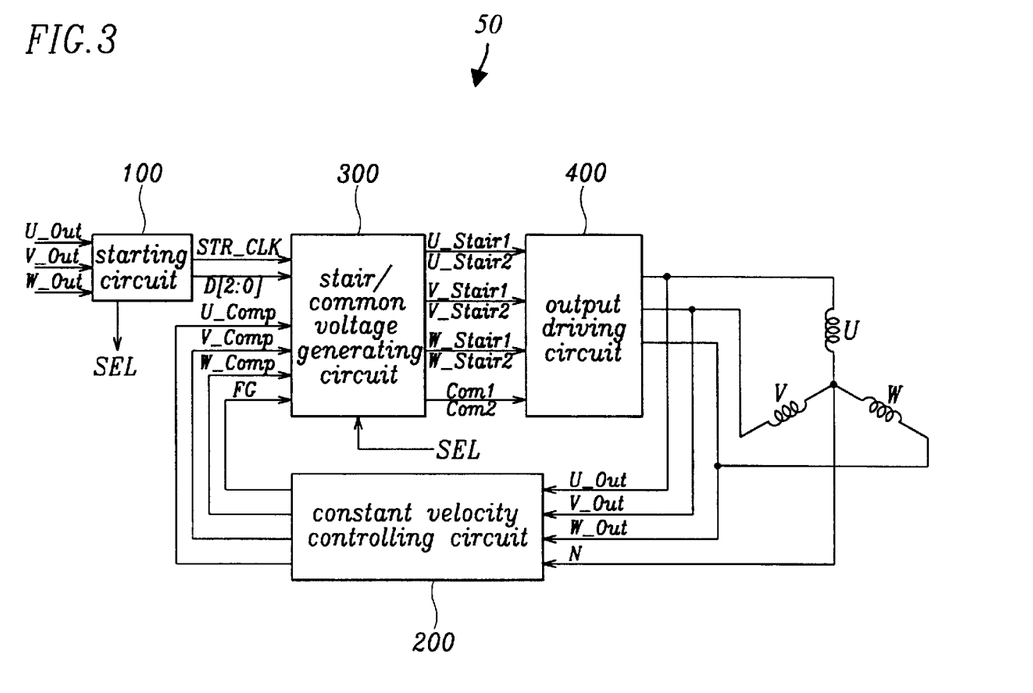
FIG. 3 illustrates a block diagram of a commutation circuit for a sensorless three-phase BLDC motor according to the invention.

FIG. 3 illustrates a block diagram of a commutation circuit 50 for a sensorless three-phase BLDC motor according to the invention. The commutation circuit 50 includes a starting circuit 100, a constant velocity controlling circuit 200, a stair/common voltage generating circuit 300, and an output driving circuit 400.

The starting circuit 100 determines whether the motor (not shown) is in a starting mode or a constant velocity mode and outputs a selection signal SEL that corresponds to the determination. The starting circuit 100 also generates a constant frequency starting clock signal STR_CLK that is used to control the commutation of the motor during the initial start-up of the motor, thereby eliminating the unstable commutation that results from using the back EMF signal to control commutation during motor start-up (i.e., before the motor rotor has reached a nominal operating speed). Additionally, the starting circuit 100 generates reference clock signals D0-D2 that each have a period six times that of the starting clock signal STR_CLK and respective phase differences of 120°.

The constant velocity controlling circuit 200 generates three comparison signals U_Comp, V_Comp, W_Comp by comparing each of the phase voltages U_Out, V_Out, W_Out of stator coils U, V, W to the neutral point voltage N of the stator coils to generate a constant velocity clock signal FG. The constant velocity clock signal FG has a frequency three times that of the comparison signals U_Comp, V_Comp, W_Comp and is used as a clocking signal for the commutation process during constant velocity operation of the motor (i.e., when the rotor of the motor has reached an operating speed).

Figure 4:
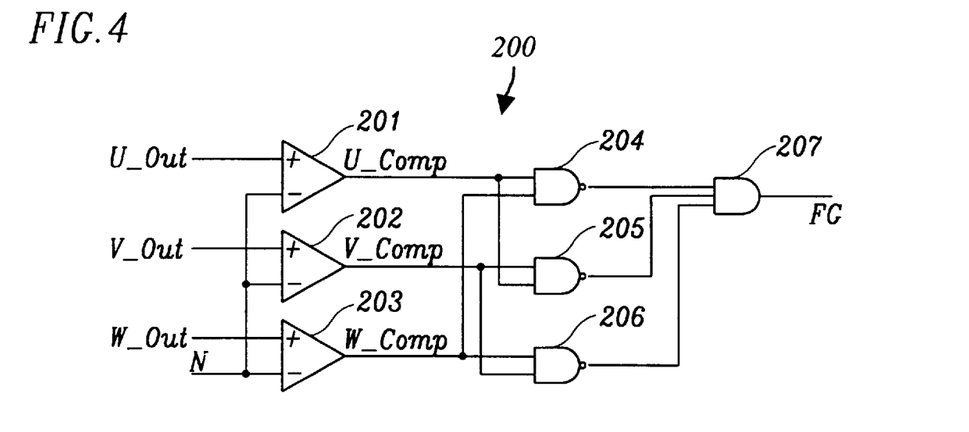
FIG. 4 illustrates an exemplary schematic diagram of the constant velocity controlling circuit of FIG. 3.

FIG. 4 illustrates an exemplary schematic diagram of the constant velocity controlling circuit 200 of FIG. 3. The constant velocity controlling circuit 200 includes first through third comparators 201, 202, 203 that receive the phase voltages U_Out, V_Out, W_Out of the stator coils at the respective noninverting inputs of the comparators 201, 202, 203. The inverting inputs of the comparators 201, 202, 203 receive the neutral point voltage N. The comparators 201, 202, 203 provide the first through third comparison signals U_Comp, V_Comp, W_Comp at the respective output terminals of the comparators 201, 202, 203. The comparison signals of the comparators 201, 202, 203 are coupled to first through third NAND gates 204, 205, 206, and the outputs of the NAND gates 204, 205, 206 are coupled to the input terminals of an AND gate 207. The first through third NAND gates 204, 205, 206 and the AND gate 207 logically combine the comparison signals U_Comp, V_Comp, W_Comp to generate the constant velocity clock signal FG.

Figure 5:
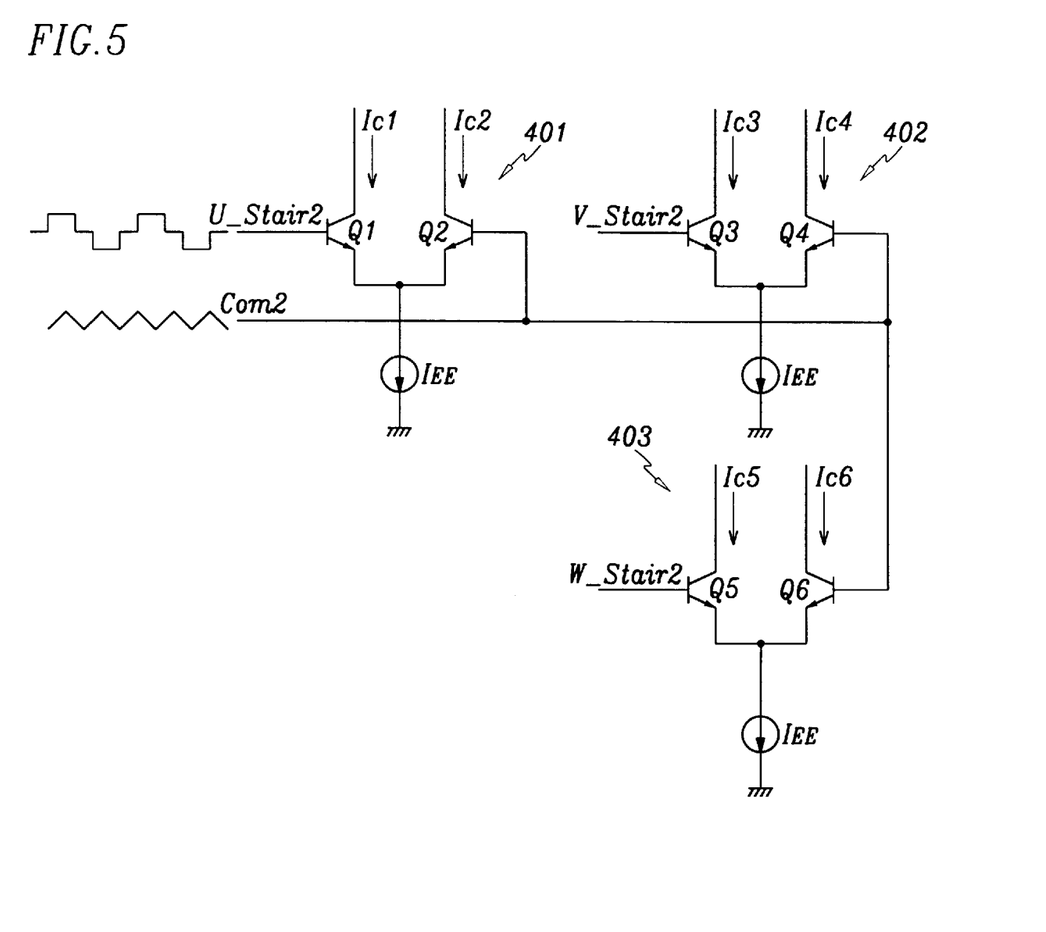
FIG. 5 illustrates an exemplary schematic diagram of an input stage of the output driving circuit of FIG. 3.

FIG. 5 illustrates an exemplary schematic diagram of an input stage of the output driving circuit 400 of FIG. 3. Generally, the output driving circuit 400 drives the motor by controlling the direction of the current that is flowing through each phase of the stator coil according to the voltage difference between a first group of stair voltages U_Stair1, V_Stair1, W_Stair1 and a first common voltage Com1 or, alternatively, according to a second group of stair voltages U_Stair2, V_Stair2, V_Stair2 and a second common voltage Com2. The first group of stair voltages U_Stair1, V_Stair1, W_Stair1 and first common voltage Com1 are applied to the input terminals of first through third differential amplifiers 401, 402, 403 in the starting mode, and the second group of stair voltages U_Stair2, V_Stair2, V_Stair2 and second common voltage Com2 are applied to the input terminals of the first through third differential amplifiers 401, 402, 403 in the constant velocity mode of the motor.

In the constant velocity mode of the motor, the second group of stair voltages U_Stair2, V_Stair2, W_Stair2 are generated by and synchronized with the constant velocity clock signal FG. The second group of stair voltages U_Stair2, V_Stair2, W_Stair2 are applied to respective base terminals of the differential amplifiers 401, 402, 403, and the common voltage Com2, which has a sawtooth waveform, is commonly applied to the other base terminals of the amplifiers 401, 402, 403.

Figure 6A:
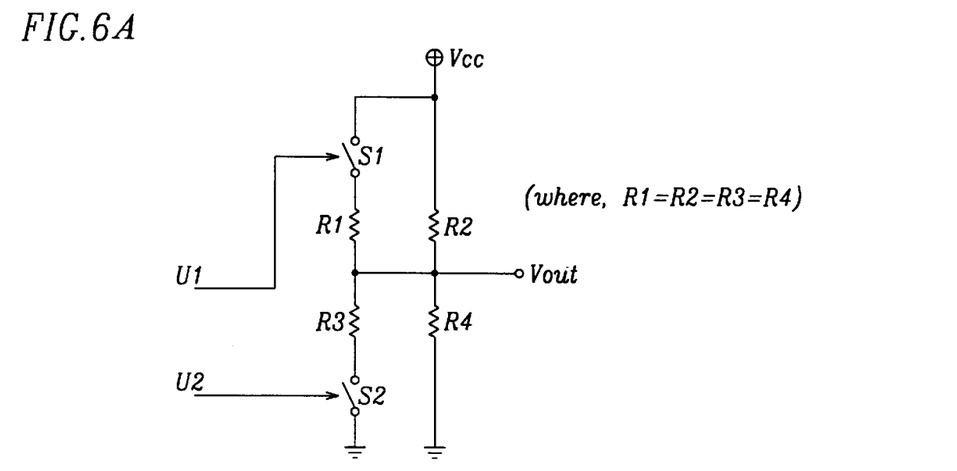
FIGS. 6A–6F illustrate the principles of generating stair voltages according to the invention.

FIGS. 6A–6F illustrate the principles of generating the above-described stair voltages according to the invention. FIG. 6A illustrates a schematic diagram of a switched resistive network that may be used in the stair/common voltage generating circuit 300 to generate cyclical stair voltage waveforms having three discrete levels. The resistors R1–R4 are of substantially the same value and, as shown, the switches S1, S2 are controlled by control signals U1, U2 and may be independently opened or closed to vary the effective voltage division provided by the resistor network to vary an output voltage Vout.

Figure 6B:
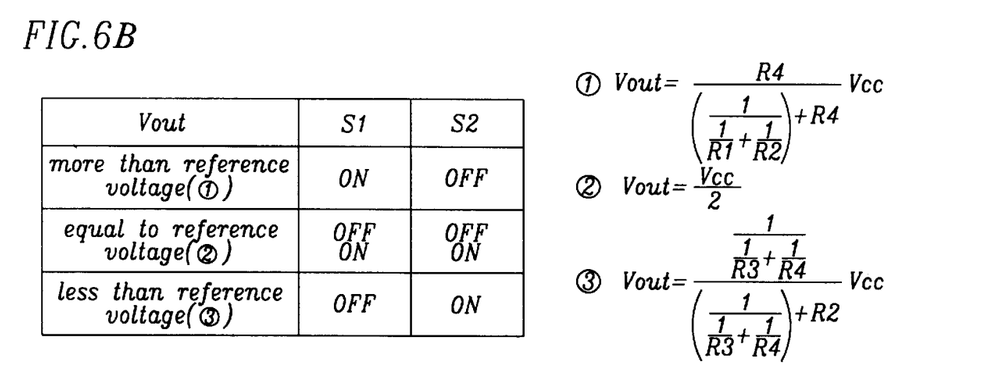

FIG. 6B shows a truth table associated with the operation of the circuit of FIG. 6A. As shown in the table, the output voltage Vout is varied between three discrete levels depending on the combined states of the switches S1, S2. In particular, Vout is defined as equal to a reference voltage level when S1 and S2 are both open or both closed, Vout is greater than the defined reference voltage when S1 is closed and S2 is open, and Vout is less than the defined reference voltage when S1 is open and S2 is closed.

Figure 6C:
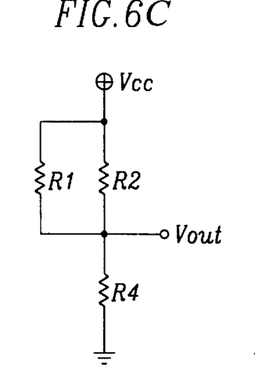

FIGS. 6C–6F illustrate equivalent circuits associated with the various combinations of the states for the switches S1 and S2 shown in FIG. 6A. Namely, FIG. 6C represents the equivalent circuit where S1 is closed and S2 is open such that the output voltage Vout is defined by Equation 1 below.

$$Vout = \frac{R4}{\frac{1}{\frac{1}{R1}+\frac{1}{R2}} + R4} Vcc \quad \text{Equation 1}$$

Figure 6D:
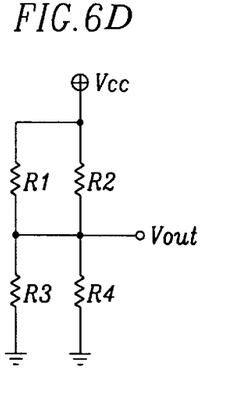
Figure 6E:
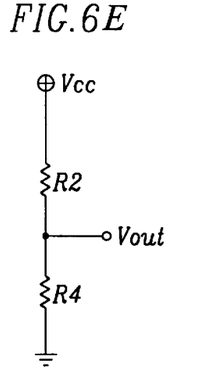

FIG. 6D represents the equivalent circuit where S1 and S2 are both closed, and FIG. 6E represents the equivalent circuit where both S1 and S2 are open. For the equivalent circuits represented in FIGS. 6D and 6E, the output voltage Vout is defined by Equation 2 below.

$$Vout(\text{reference voltage}) = \frac{Vcc}{2} \quad \text{Equation 2}$$

Figure 6F:
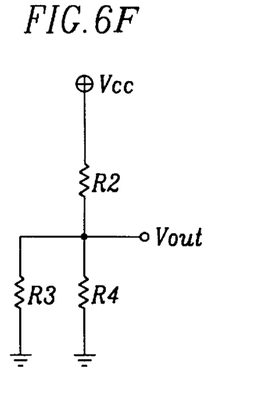

FIG. 6F represents the equivalent circuit where S1 is open and S2 is closed, which results in an output voltage Vout according Equation 3 below.

$$Vout = \frac{\frac{1}{\frac{1}{R3}+\frac{1}{R4}}}{\frac{1}{\frac{1}{R3}+\frac{1}{R4}} + R2} Vcc \quad \text{Equation 3}$$

In operation, the first group of stair voltages U_Stair1, V_Stair1, W_Stair1 are generated during the starting mode of the motor by using the reference clock signals D0–D2 as the control signals U1, U2 to switch the switches S1 and S2. For example, reference clock signals D0 and D1 are used as the control signals U1, U2 to generate the stair voltage U_Stair1, signals D1 and D2 are used to generate the stair voltage V_Stair1, and signals D2 and D0 are used to generate the stair voltage W_Stair1.

To generate the second group of stair voltages U_Stair2, V_Stair2, W_Stair2 in the constant velocity mode of the motor, the comparison signals U_Comp, V_Comp, W_Comp are used as the control signals U1, U2 to switch the switches S1, S2. For example, the comparison signals W_Comp and U_Comp are used as the control signals U1, U2 to generate the stair voltage U_Stair2, the comparison signals U_Comp and V_Comp are used to generate the stair voltage V_Stair2, and the comparison signals V_Comp and W_Comp are used to generate the stair voltage W_Stair2.

Figure 7:
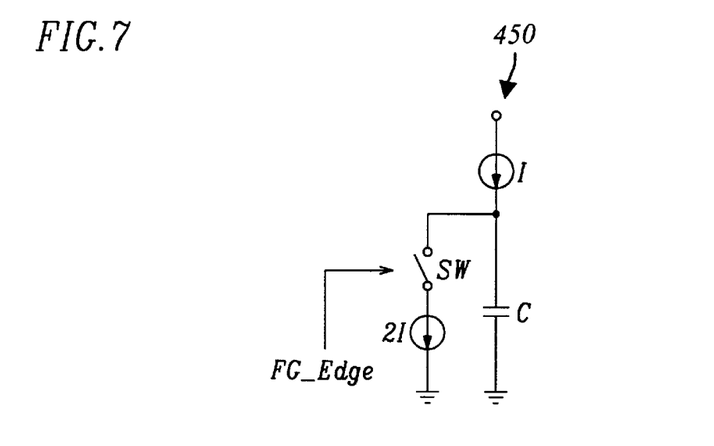
FIG. 7 illustrates an exemplary schematic diagram of a circuit capable of generating common voltages according to the invention.

FIG. 7 illustrates an exemplary schematic diagram of a circuit 450 capable of generating common voltages according to the invention. The circuit 450 includes a switch SW that is switched on/off (i.e., closed/open) by the edge signal FG_Edge of the constant velocity clock signal FG, first and second current sources 1, 2*I, and a capacitor C.

In operation, the switch SW is repeatedly switched on/off by the edge signal FG_Edge such that the capacitor C integrates a current I or –I, thereby generating a sawtooth voltage waveform having substantially constant slopes across the capacitor C. In this manner, the circuit 450 may be used in the constant velocity mode of the motor to generate the second common voltage Com2.

Figure 8:
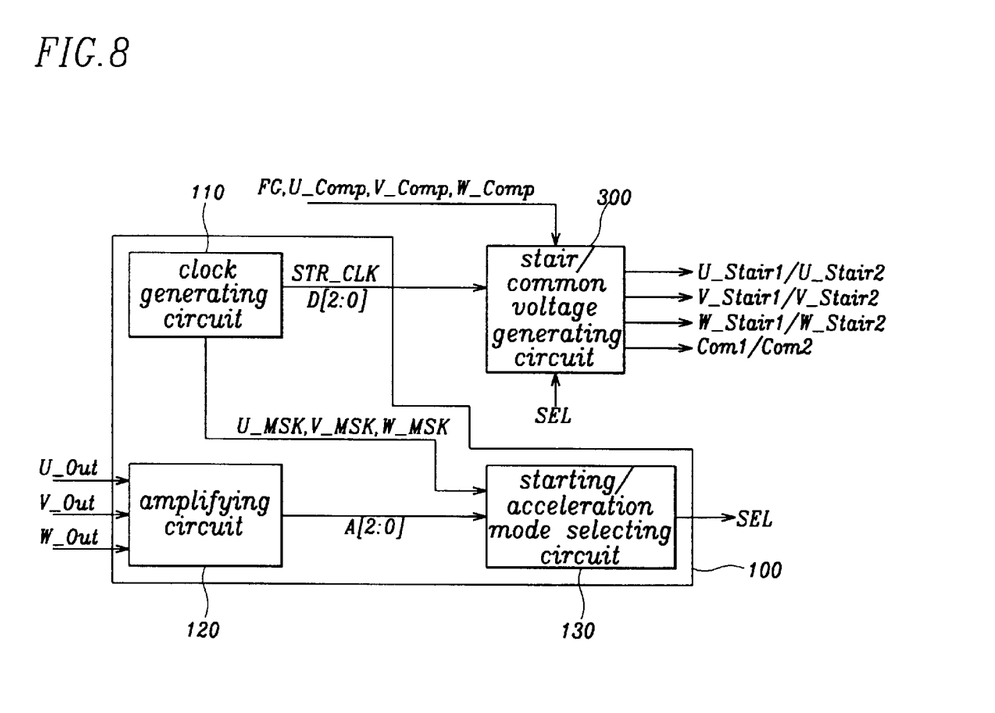
FIG. 8 illustrates a more detailed block diagram of the starting circuit of FIG. 3.

FIG. 8 illustrates a more detailed block diagram of the starting circuit 100 of FIG. 3. The starting circuit 100 includes a clock generating circuit 110, an amplifying circuit 120, and a starting/acceleration mode selecting circuit 130. The clock generating circuit 110 generates the starting clock signal STR_CLK having a constant frequency and generates the three reference clock signals D0–D2. The three reference clock signals D0–D2 have a period six times the period of the starting clock signal STR_CLK and respective phase differences of 120°. The starting circuit 100 additionally generates mask clock signals U_MSK, V_MSK, W_MSK to detect the phase voltage of the unexcited coil at the time of commutation.

The amplifying circuit 120 amplifies the respective phase voltages U_Out, V_Out, W_Out of the stator coil and generates amplified signals A0–A2. When the amplified signals A0–A2 increase to a constant level while the mask clock signals U_MSK, V_MSK, W_MSK are enabled, the starting/acceleration mode selecting circuit 130 is enabled and generates the selection signal SEL to drive the motor from the starting mode to the acceleration mode.

Figure 9:
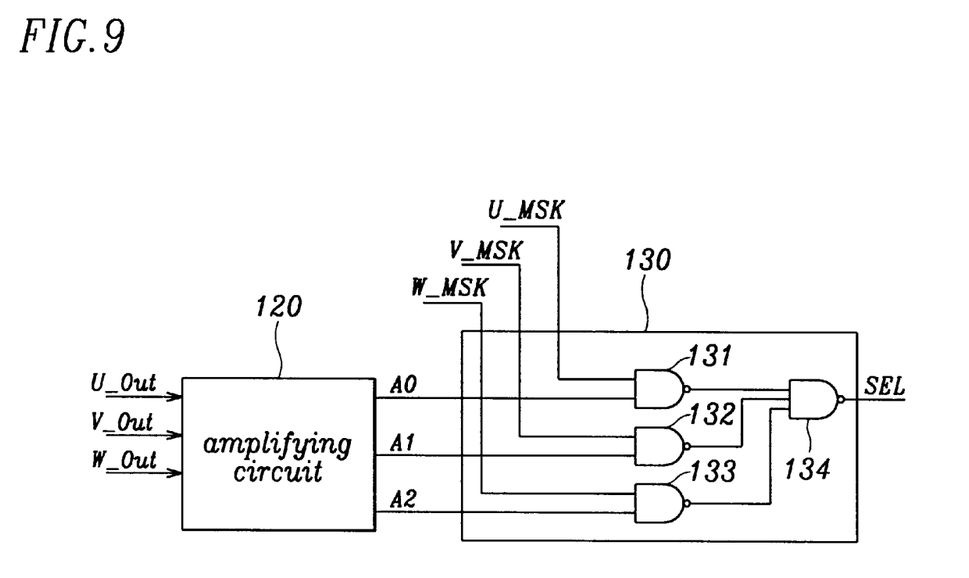
FIG. 9 illustrates a more detailed schematic diagram of the amplifying and mode selection circuits of FIG. 8.

FIG. 9 illustrates a more detailed schematic diagram of the amplifying and mode selection circuits 120, 130 of FIG. 8. The mode selection circuit 130 includes first through third NAND gates 131–133, which receive the amplified signals A0–A2 of the amplifying circuit 120 as their respective inputs, and which receive the mask clock signals U_MSK, V_MSK, W_MSK as further respective inputs. The first through third NAND gates 131–133 perform logical operations with the U_MSK and A0 signals, with the V_MSK and A1 signals, and with the W_MSK and A2 signals, respectively. A fourth NAND gate 134 receives the outputs of the first through third NAND gates 131–133 to generate the selection signal SEL.

Figure 10:
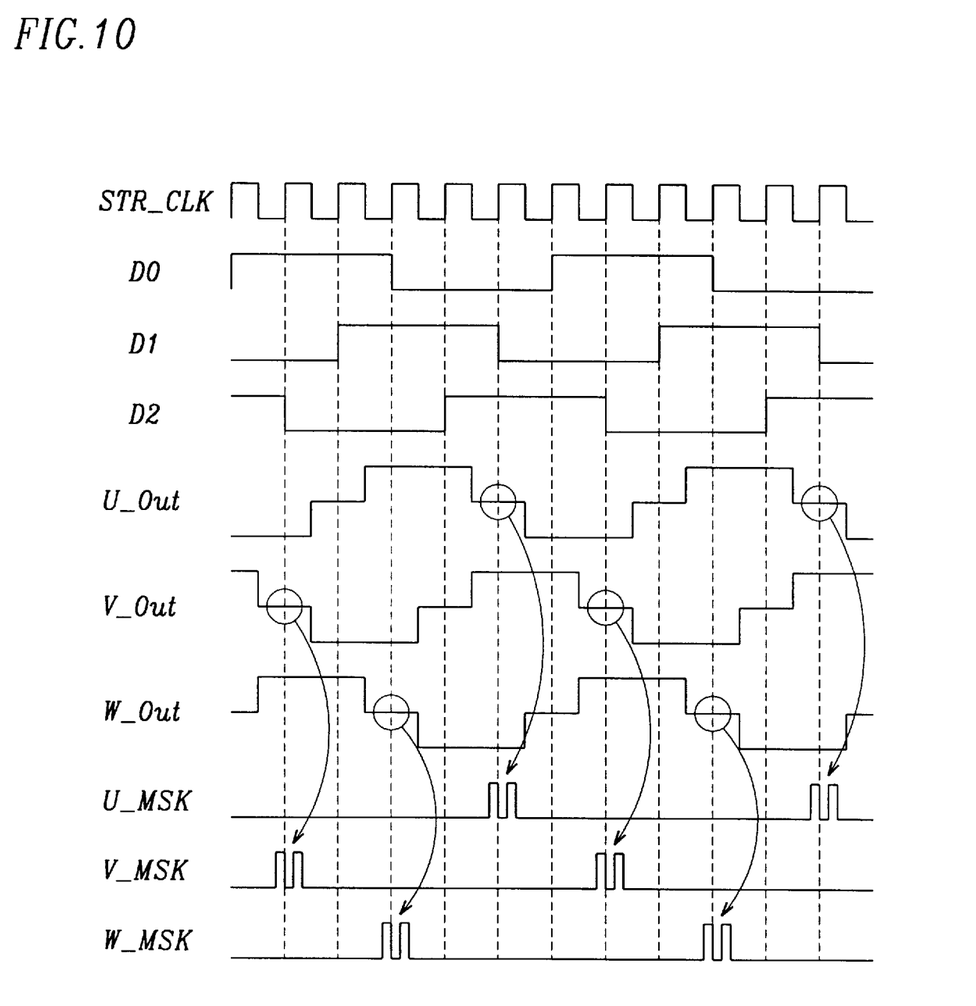
FIG. 10 illustrates a timing diagram of signals associated with the sensorless three-phase BLDC motor starting circuit of FIG. 8.

In operation, the mask clock signals U_MSK, V_MSK, W_MSK and the amplified signals A0–A2 are enabled at the unexcited point of each phase of the motor coil in order to detect the pure back electromotive force that is generated on the unexcited phase from among the phases of the stator coil (FIG. 10). The fact that the amplitude of the amplified signals A0–A2 is greater than a predetermined fixed level during the above-noted detection interval indicates that the amplitude of the back EMF is more than a predetermined fixed value, which indicates that the motor is either accelerating or running at a constant operational speed.

When the selection signal SEL is disabled, the stair/common voltage generating circuit 300 is synchronized with the starting clock signal STR_CLK and the reference clock signals D0–D2 to generate the first group of stair voltages U_Stair1, V_Stair1, W_Stair1 and the first common voltage Com1. When the selection signal SEL is enabled, the stair/common voltage generating circuit 300 is synchronized with the constant velocity clock signal FG and the comparison signals U_Comp, V_Comp, W_Comp to generate the second group of stair voltages U_Stair2, V_Stair2, W_Stair2 and the second common voltage Com2.

Figure 11:
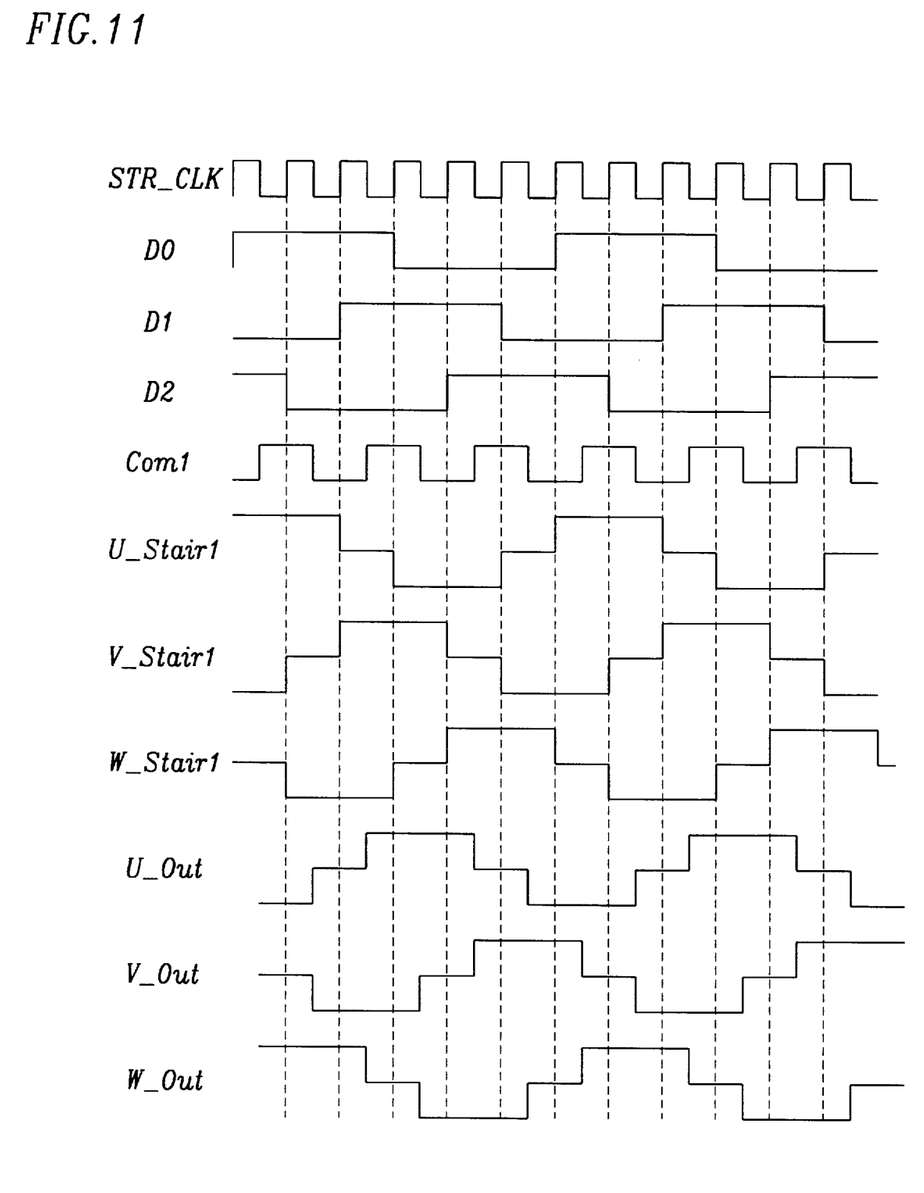
FIG. 11 illustrates a timing diagram of signals associated with the starting mode of the motor according to the invention.

FIG. 11 illustrates a timing diagram of the above-described signals associated with the starting mode of the motor according to the invention. The stair/common voltage generating circuit 300, according to the states of the selection signal SEL, generates the first common voltage Com1 as a square wave having a period twice the period of the starting clock signal STR_CLK. The stair/common voltage generating circuit 300 uses the clock signals D0–D2 to simultaneously generate the first group of three stair voltages U_Stair1, V_Stair1, W_Stair1 having respective phase difference of 120° when iterating three-phase with a voltage equal to the reference voltage during a period of the starting clock signal, iterating three-phase with a voltage equal to and below the reference voltage during next two periods of the starting clock signal, iterating three-phase with a voltage equal to the reference voltage during next one period of the starting clock signal, and iterating three-phase with a voltage equal to and over the reference voltage during next two periods of the starting clock signal.

Figure 12:
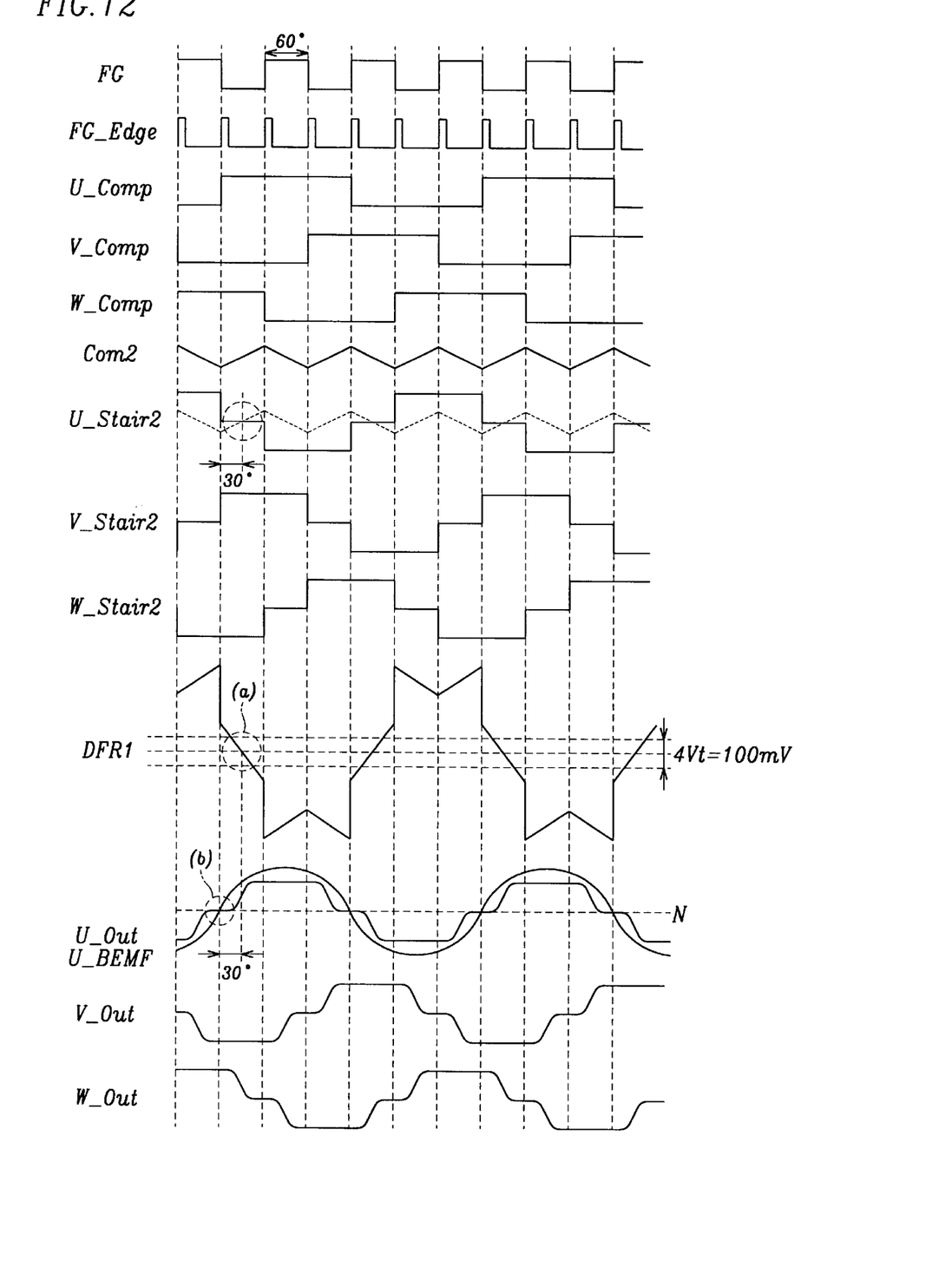
FIG. 12 illustrates a timing diagram of the signals associated with the constant or accelerated velocity mode of the motor according to the invention.

FIG. 12 illustrates a timing diagram of the signals associated with the constant or accelerated velocity mode of the motor according to the invention. The stair/common voltage generating circuit 300 uses the leading edge of the constant velocity clock signal FG to generate the edge signal FG_Edge. The edge signal FG_Edge is used to generate the second common voltage Com2. As shown, the second common voltage Com2 has a sawtooth waveform that repeatedly ramps between a maximum value and minimum value at a constant slope in response to the rising and falling edges of the edge signal FG_Edge.

The stair/common voltage generating circuit 300 uses the comparison signals U_Comp, V_Comp, W_Comp to simultaneously generate the second group of three stair voltages U_Stair2, V_Stair2, W_Stair2 having respective phase differences of 120° when iterating three-phase with a voltage equal to the reference voltage during a period of the edge signal, iterating three-phase with a voltage equal to and below the reference voltage during next two periods of the edge signal, iterating three-phase with a voltage equal to the reference voltage during next one period of the edge signal, and iterating three-phase with a voltage equal to and over the reference voltage during next two periods of the edge signal.

In an interval highlighted by detail (a) in FIG. 12, the difference voltage DFR1 between the second common voltage Com2, which is generated based on the edge signal FG_Edge of the constant velocity clock signal and the stair voltage U_Stair2, is less than 100 mV. Because the input stage (FIG. 5) of the output driving circuit 400 is operating in a linear mode in this interval, it is possible to perform soft switching within the interval. For example, as can be seen in FIG. 12, the point at which the stair voltage U_Stair2 intersects the second common voltage Com2 is electrically delayed 30° with respect to the zero crossing point highlighted in detail (b). Thus, when the difference voltage between the second group of three stair voltages generated during the constant velocity mode of the motor and the sawtooth waveform of the second common voltage Com2 is used, precise commutation can be executed for each phase at the point electrically delayed by 30° from the zero crossing point of the back EMF without additional delay circuitry.

A range of changes and modifications can be made to the preferred embodiment described above. The foregoing detailed description should be regarded as illustrative rather than limiting and the following claims, including all equivalents, are intended to define the scope of the invention.

What is claimed is:

1. A commutation circuit for a sensorless three-phase brushless DC motor, comprising:

a starting circuit adapted to generate a selection signal that indicates whether a motor is in a starting mode or a constant velocity mode by detecting the size of each phase voltage of the motor stator coil and to generate a starting clock signal to forcibly start the motor without information associated with the position of the motor rotor, and being further adapted to generate first, second and third reference clock signals having respective phase differences of 120° and that are synchronized with the starting clock signal;

a constant velocity controlling circuit adapted to compare each phase voltage and a neutral point voltage of the stator to generate first, second and third comparison signals and a constant velocity clock signal having a frequency three times the frequency of the comparison signals;

a stair/common voltage generating circuit, which in response to the selection signal generated from the starting circuit in the starting mode is controlled by the reference clock signals to simultaneously generate a first group of three stair voltages having respective phase differences of 120° when iterating three-phase with a first voltage equal to a reference voltage during a first period of the starting clock signal, iterating three-phase with a second voltage less than the reference voltage during subsequent second and third periods of the starting clock signal, iterating three-phase with the reference voltage during a subsequent fourth period of the starting clock signal, and iterating three-phase with a third voltage greater than the reference voltage during subsequent fifth and sixth periods of the starting clock signal, and, in the constant velocity mode of the motor, is controlled by the reference clock signals to simultaneously generate a second group of three stair voltages having respective phase differences of 120°, when iterating three-phase with a fourth voltage equal to a second reference voltage during a first period of the constant velocity clock signal, iterating three-phase a fifth voltage less than the second reference voltage during subsequent second and third periods of the constant velocity clock signal, iterating three-phase with the second reference voltage during a subsequent fourth period of the constant velocity clock signal, and iterating three-phase with a sixth voltage greater than the second reference voltage during subsequent fifth and sixth periods of the constant velocity clock signal; and an output driving circuit, controlling the direction of the current in the respective phases of the stator coil in response to the voltage differences between the first group of stair voltages and a first common voltage in the starting mode of the motor and in response to the voltage differences between the second group of stair voltages and a second common voltage in the constant velocity mode of the motor.

2. The circuit of claim 1, wherein the second reference voltage of the second group of stair voltages intersects the second common voltage at a point which is electrically delayed by 30° from a zero crossing point at which a back electromotive force generated in each phase of the stator coil intersects the neutral point voltage.

3. The circuit of claim 2, wherein each reference clock signal has a period six times the period of the starting clock signal.

4. The circuit of claim 3, wherein the stair/common voltage generating circuit, in the starting mode, is adapted to generate the first common voltage to have a square waveform and a period twice the period of the starting clock signal, and, in the constant velocity mode, generate the second common voltage to have a sawtooth waveform that repeatedly ramps between a maximum and minimum value with a constant slope at both the rising and falling edges of the constant velocity clock signal.

5. The circuit of claim 4, wherein the stair/common voltage generating circuit, in the constant velocity mode, is adapted to detect the edge of the constant velocity clock signal and generate an edge signal of a pulse form, and to generate the second common voltage of the sawtooth waveform by using the edge signal.

6. The circuit of claim 4, wherein the stair/common voltage generating circuit, in the constant velocity mode, is adapted to receive the first, second and third comparison signals as control signals, such that when the states of the first and second comparison signals are both at a high level or both at a low level, the second reference voltage is generated, and when the state of the first comparison signal is at a high level and the state of the second comparison signal is at a low level, a voltage higher than the second reference voltage is generated, and when the state of the first comparison signal is at a low level and the state of the second comparison signal is at a high level, a voltage lower than the second reference voltage is generated.

7. The circuit of claim 6, wherein the stair/common voltage generating circuit, in the starting mode, is adapted to receive the first, second and third reference clock signals as control signals, and when the first and second reference clock signals are both at a high level or both at a low level, the first reference voltage is generated, and when the state of the first reference clock signal is at a high level and the state of the second reference clock signal is at a low level, a voltage higher than the first reference voltage is generated, and when the state of the first reference clock signal is at a low level and the state of the second reference clock signal is at a high level, a voltage lower than the first reference voltage is generated.

8. The circuit of claim 1, wherein the constant velocity controlling circuit comprises:

three comparators, each of the comparators receiving the phase voltages of the stator coil at non-inverting inputs and commonly receiving the neutral point voltage at inverting inputs such that each of the comparators compares one of the phase voltages of the stator to the neutral point voltage;

three logical NAND operating means for alternately receiving two different output signals among the output signals of the comparators and executing a logical NAND operation with the received signals; and a logical AND operating means for executing logical AND operation with the output signal provided from the logical NAND operation.

9. The circuit of claim 1, wherein the starting circuit comprises:

a clock generating circuit adapted to generate a starting clock signal having a constant frequency that is used to forcibly initialize the motor without information associated with the rotor position, and further being adapted to generate mask clock signals to detect the phase voltages of the unexcited coil at the time of commutation;

an amplifying circuit adapted to amplify the respective phase voltages of the stator coil and to generate three amplified signals; and a starting/constant velocity mode selecting circuit adapted to generate the selection signal to drive the motor from the starting mode to the constant velocity mode when the amplified signals are increased to a predetermined constant level while the mask clock signals are enabled.

10. The circuit of claim 9, wherein the starting/constant velocity mode selecting circuit comprises:

first, second and third NAND operating means each having at least two inputs that each receive one of the amplified signals at one of the inputs and that each receive one of the mask clock signals at the other one of the inputs, whereby the first, second and third NAND operating means execute a logical NAND operation with the inputs; and a second logical NAND operating means for executing a second logical NAND operation with the output signals of the first, second and third logical NAND operating means.

11. A starting circuit for a sensorless three-phase brushless DC motor, comprising:

a clock generating circuit adapted to generate a starting clock signal having a constant frequency to forcibly initialize a motor without information associated with the rotor position, and first, second and third reference clock signals each having a period six times the period of the starting clock signal and respective phase differences of 120°, and further adapted to generate mask clock signals to detect the phase voltage of an unexcited stator coil at the time of commutation;

an amplifying circuit adapted to amplify the respective phase voltages of the stator coil and to generate first, second and third amplified signals; and a starting/constant velocity mode selecting circuit adapted to generate the selection signal to drive the motor from the starting mode to the constant velocity mode when the amplified signals are increased to a predetermined constant level while the mask clock signals are enabled.

12. The circuit of claim 11, wherein the starting/constant velocity mode selecting circuit comprises:

three logical NAND operating means for receiving the amplified signals as one input and receiving the mask clock signals as another input and performing a first logical NAND operation with the two inputs; and a logical NAND operating means for executing a second logical NAND operation with the output signals of the three logical NAND operating means.

13. A method for controlling the commutation of a sensorless three-phase brushless DC motor, comprising the steps of:

generating a starting clock signal to forcibly initialize a motor without information associated with the position of the rotor and to generate first, second and third reference clock signals having phase differences of 120° and that are synchronized with the starting clock signal;

generating a first common voltage having a square waveform and a period twice the period of the reference clock signals;

generating simultaneously along with the first common voltage a first group of three stair voltages having respective phase differences of 120°, when iterating three-phase with a first voltage equal to a first reference voltage during a first period of the starting clock signal, iterating three-phase with a second voltage less than the first reference voltage during subsequent second and third periods of the starting clock signal, iterating three-phase with the reference voltage during a subsequent fourth period of the starting clock signal, and iterating three-phase with a third voltage greater than the first reference voltage during subsequent fifth and sixth periods of the starting clock signal;

forcibly controlling the direction of the current in each phase of the stator coil by using the first group of stair voltages and the first common voltage;

comparing each of the phase voltages to the neutral point voltage of the coil of the stator to generate first, second and third comparison signals and to generate a constant velocity clock signal having a frequency three times the frequency of the comparison signals;

generating a second common voltage having a sawtooth waveform that repeatedly ramps with constant slopes between a maximum and a minimum value at both the rising and falling of the edges of the constant velocity clock signal in the constant velocity mode of the motor;

generating a second group of three stair voltages having respective phase differences of 120°, when iterating three-phase with a fourth voltage equal to a second reference voltage during a first period of the constant velocity clock signal, iterating three-phase with a fifth voltage less than the second reference voltage during subsequent second and third periods of the constant velocity clock signal, iterating three-phase with the second reference voltage during a subsequent fourth period of the constant velocity clock signal, and iterating three-phase with a sixth voltage greater than the second reference voltage during subsequent fifth and sixth periods of the constant velocity clock signal; and controlling the direction of the current in each phase of the stator coil by using the second group of stair voltages and the second common voltage.

14. The method of claim 13, wherein the second reference voltage of the second group of stair voltages intersects the second common voltage is electrically delayed by 30° from a zero crossing point at which a back electromotive force generated in each phase of the stator coil intersects the neutral point voltage.

15. The method of claim 14, wherein the reference clock signals have a period six times the period of the starting clock signal.

16. The method of claim 15, wherein the step of generating the second common voltage comprises the steps of:

detecting the edge of the constant velocity clock signal and generating edge signals of a pulse form; and generating the second common voltage to have a sawtooth wave pattern by using the edge signals.

17. The method of claim 13, wherein the step of generating the second group of stair voltages comprises the steps of:

receiving the first, second and third comparison signals as control signals such that when first and second comparison signals are both at a high level or both at a low level, the second reference voltage is generated;

generating the third voltage that is higher than the second reference voltage when the state of the first comparison signal is at a high level and the state of the second comparison signal is at a low level; and generating the second voltage that is lower than the second reference voltage when the state of the first comparison signal is at a low level and the state of the second comparison signal is at a high level.

18. The method of claim 13, wherein the step of generating the first stair voltage comprises the steps of:

receiving the first, second and third reference clock signals as control signals, and when first and second reference clock signals are both at a high level or both at a low level, generating the first reference voltage;

generating the third voltage that is greater than the first reference voltage when the state of the first reference clock signal is at a high level and the state of the second reference clock signal is at a low level; and generating the second voltage that is less than the first reference voltage when the state of the first reference clock signal is at a low level and the state of the second reference clock signal is at a high level.

19. The method of claim 13, wherein the step of generating the constant velocity clock signal comprises the steps of:

receiving the phase voltages of the stator coil at non-inverting inputs of the comparators and commonly receiving the neutral point voltage at inverting inputs of the comparators to respectively compare the phase voltage and neutral point voltages;

alternately receiving in three logical NAND operating means two different output signals from among the output signals of the comparators, and executing logical NAND operations therein with the received signals; and executing a logical AND operation with the output signal of the logical NAND operation.

* * * * *